(12) United States Patent
Hamanaka et al.

(10) Patent No.: US 7,716,373 B2
(45) Date of Patent: May 11, 2010

(54) METHOD, APPARATUS, AND COMPUTER PRODUCT FOR UPDATING SOFTWARE

(75) Inventors: Seishiro Hamanaka, Kawasaki (JP);
Yoshinobu Hibi, Kawasaki (JP);
Masayuki Naitou, Kawasaki (JP);
Shigehiro Yoshikawa, Kawasaki (JP);
Satoshi Iyoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 363 days.

(21) Appl. No.: 11/786,438

(22) Filed: Apr. 11, 2007

(65) Prior Publication Data

US 2007/0244999 A1 Oct. 18, 2007

Related U.S. Application Data

(63) Continuation of application No. PCT/JP2004/015035, filed on Oct. 12, 2004.

(51) Int. Cl.
*G06F 15/16* (2006.01)
(52) U.S. Cl. .................. 709/246; 709/221; 709/224; 718/105; 717/168
(58) Field of Classification Search ................ 709/201, 709/220, 221, 223, 246, 248, 224; 718/105; 717/168
See application file for complete search history.

(56) References Cited

U.S. PATENT DOCUMENTS 5,729,761 A    3/1998    Murata et al.

6,725,261 B1    4/2004    Novaes et al.
2004/0203593 A1 * 10/2004   Whelan et al. .............. 455/411
2006/0046717 A1 *  3/2006   Bovell et al. ............. 455/432.3

FOREIGN PATENT DOCUMENTS

| EP | 0 683 453 | 11/1995 |
|---|---|---|
| JP | 07-152667 | 6/1995 |
| JP | 07-306844 | 11/1995 |
| JP | 7-306844 | 11/1995 |
| JP | 2002-49601 | 2/2002 |
| JP | 2002-163241 | 6/2002 |
| JP | 2003-015894 | 1/2003 |
| JP | 2003-108255 | 4/2003 |
| JP | 2003-296132 | 10/2003 |
| JP | 2003-316581 | 11/2003 |
| WO | WO 99/45465 | 9/1999 |
| WO | WO 02/41141 | 5/2002 |

OTHER PUBLICATIONS

Travis Paul, "Configuration Goes Automatic," Information Week, Mar 7, 1029, ABI/INFORM Global, p. 61.*

* cited by examiner

*Primary Examiner*—Oanh Duong
(74) *Attorney, Agent, or Firm*—Greer, Burns & Crain, Ltd.

(57) ABSTRACT

Current configuration information of an information processing apparatus, post configuration information after updating a software, configuration information of a network device are stored in a database. A selection of a software image for updating the software of the information processing apparatus and a change of a configuration of the network device are considered, based on the pieces of configuration information. An automation of an operation of updating the software is realized by sending a result of consideration to an agent deployed in the information processing apparatus and causing the information processing apparatus to perform a desired processing.

9 Claims, 12 Drawing Sheets

FIG.4

POOL GROUP DATA
710

| POOL GROUP NAME | TYPE | SERVER DOMAIN NAME |
|---|---|---|
| Web_domain.pool | SERVER GROUP SHARING | Web_domain |
| AP_domain.pool | SERVER GROUP SHARING | AP_domain |
| DB_domain.pool | SERVER GROUP SHARING | DB_domain |
| A_DB.pool | SERVER GROUP ONLY | |
| B_DB.pool | SERVER GROUP ONLY | |

FIG.5

SERVER GROUP DATA
720

| SERVER GROUP NAME | SERVER DOMAIN NAME | SOFTWARE DISTRIBUTION IMAGE NAME | VERSION | STORAGE TEMPLATE NAME | SAN BOOT | AUTO RECOVERY |
|---|---|---|---|---|---|---|
| A_Web | Web_domain | A_OS_Web_image | 1.0 | A_Web_Str_template | O | × |
| B_Web | Web_domain | B_OS_Web_image | 1.1 | B_Web_Str_template | O | × |
| A_AP | AP_domain | A_OS_AP_image | 1.3 | A_AP_Str_template | O | O |
| B_AP | AP_domain | B_OS_AP_image | 1.6 | B_AP_Str_template | O | O |
| A_DB | DB_domain | C_OS_DB_A_image | 1.0 | A_DB_Str_template | O | × |
| B_DB | DB_domain | C_OS_DB_B_image | 1.0 | B_DB_Str_template | O | × |
| A_Batch | DB_domain | C_OS_Batch_image | 1.1 | A_Batch_Str_template | O | × |

FIG.6

PROVISIONING CONFIGURATION DATA
730

| SERVER NAME | POOL GROUP NAME | SERVER GROUP NAME | STORAGE SUB-GROUP NAME | ACCESS-IBILITY |
|---|---|---|---|---|
| host1 | - | A_Web | A_Web_rootdisk_host1 | O |
| | | | A_Web_localdisk_host1 | O |
| host2 | - | A_Web | A_Web_rootdisk_host2 | O |
| | | | A_Web_localdisk_host2 | O |
| host3 | - | B_Web | B_Web_rootdisk_host3 | O |
| | | | A_Web_localdisk_host3 | O |
| host4 | - | B_Web | B_Web_rootdisk_host4 | O |
| | | | A_Web_localdisk_host4 | O |
| host5 | Web_domain.pool | - | A_Web_rootdisk_host5 | × |
| | | | A_Web_localdisk_host5 | × |
| | | | B_Web_rootdisk_host5 | × |
| | | | B_Web_localdisk_host5 | × |
| host6 | - | A_AP | A_AP_rootdisk_host6 | O |
| | | | A_AP_localdisk_host6 | O |
| host7 | - | A_AP | A_AP_rootdisk_host7 | O |
| | | | A_AP_localdisk_host7 | O |
| host8 | - | B_AP | B_AP_rootdisk_host8 | O |
| | | | B_AP_localdisk_host8 | O |
| host9 | - | B_AP | B_AP_rootdisk_host9 | O |
| | | | B_AP_localdisk_host9 | O |
| host10 | AP_domain.pool | - | - | - |
| host11 | - | A_DB | A_DB_rootdisk_host11 | O |
| | | | A_DB_localdisk_host11 | O |
| | | | A_Batch_rootdisk_host11 | × |
| host12 | - | A_DB | A_DB_rootdisk_host12 | O |
| | | | A_DB_localdisk_host12 | O |
| | | | A_Batch_rootdisk_host12 | × |
| host13 | - | B_DB | B_DB_rootdisk_host13 | O |
| | | | B_DB_localdisk_host13 | O |
| host14 | - | B_DB | B_DB_rootdisk_host14 | O |
| | | | B_DB_localdisk_host14 | O |
| host15 | B_DB_domain.pool | - | - | - |

FIG.7

INTER-SERVER-GROUP LINK DATA
740

| FRONT SERVER GROUP NAME | NETWORK GROUP NAME | BACK SERVER GROUP NAME |
|---|---|---|
| *Internet* | A_Internet - Edge | A_Web |
| *Internet* | B_Internet - Edge | B_Web |
| A_Web | A_Web - AP | A_AP |
| B_Web | B_Web - AP | B_AP |
| A_AP | A_AP - DB | A_DB |
| B_AP | B_AP - DB | B_DB |

FIG.8

NETORK GROUP DATA
750

| NETWORK GROUP NAME | NETWORK DOMAIN NAME | FRONT NETWORK SUB-GROUP NAME | LOAD DISTRIBUTION GROUP NAME | BACK NETWORK SUB-GROUP NAME |
|---|---|---|---|---|
| A_Internet - Edge | Internet - Edge | *Internet* | A_Web_LB | A_Web - Front |
| B_Internet - Edge | Internet - Edge | *Internet* | B_Web_LB | B_Web - Front |
| A_Web - AP | Web - AP | A_Web - Back | A_AP_LB | A_AP - Front |
| B_Web - AP | Web - AP | B_Web - Back | B_AP_LB | B_AP - Front |
| A_AP - DB | AP - DB | A_AP - Back | — | A_DB - Front |
| B_AP - DB | AP - DB | B_AP - Back | — | B_DB - Front |

FIG.11

LOAD DISTRIBUTION GROUP DATA
760

| LOAD DISTRIBUTION GROUP NAME | LOAD BALANCER NAME | REPRE-SENTATIVE IP |
|---|---|---|
| A_Web_LB | Web_LB | 10.0.1.1 |
| B_Web_LB | Web_LB | 10.0.1.2 |
| A_AP_LB | AP_LB | 10.1.3.1 |
| B_AP_LB | AP_LB | 10.1.4.1 |

FIG.12

DISTRIBUTION MANAGEMENT DATA
770

| SERVER NAME | STORAGE SUB-GROUP NAME | SOFTWARE DISTRIBUTION IMAGE NAME | VERSION | STATUS |
|---|---|---|---|---|
| host1 | A_Web_rootdisk_host1 | A_OS_Web_image | 1.0 | COMPLETE |
| host2 | A_Web_rootdisk_host2 | A_OS_Web_image | 1.0 | DISTRIBUTING... |
| host3 | B_Web_rootdisk_host3 | B_OS_Web_image | 1.1 | FAILED |
| host4 | B_Web_root disk_host4 | B_OS_Web_image | 1.1 | COMPLETE |
| host5 | A_Web_rootdisk_host5 | A_OS_Web_image | 1.0 | COMPLETE |
|  | B_Web_rootdisk_host5 | B_OS_Web_image | 1.1 | COMPLETE |
| host6 | A_AP_rootdisk_host6 | A_OS_AP_image | 1.2 | COMPLETE |
| host7 | A_AP_rootdisk_host7 | A_OS_AP_image | 1.2 | COMPLETE |
| host8 | B_AP_rootdisk_ho st8 | B_OS_AP_image | 1.6 | COMPLETE |
| host9 | B_AP_rootdisk_host9 | B_OS_AP_image | 1.6 | COMPLETE |
| host10 | - | - | - | - |
| host11 | A_DB_rootdisk_host11 | C_OS_DB_A_image | 1.0 | COMPLETE |
|  | A_Batch_rootdisk_host11 | C_OS_Batch_image | 1.1 | COMPLETE |
| host12 | A_DB_rootdisk_host12 | C_OS_DB_A_image | 1.0 | COMPLETE |
|  | A_Batch_rootdisk_host12 | C_OS_Batch_image | 1.1 | COMPLETE |
| host13 | B_DB_rootdisk_host13 | C_OS_DB_B_image | 1.0 | COMPLETE |
| host14 | B_DB_rootdisk_host14 | C_OS_DB_B_image | 1.0 | COMPLETE |
| host15 | - | - | - | - |

FIG.13

SOFTWARE DISTRIBUTION
IMAGE MANAGEMENT DATA
780

| SOFTWARE DISTRIBUTION IMAGE NAME | VERSION | SERVER ARCHITECTURE NAME | SOFTWARE IMAGE/SNAPSHOT NAME |
|---|---|---|---|
| A_OS_Web_image | 1.0 | ARC_A<br>ARC_B | apimg_snap_1 |
| B_OS_Web_image | 1.1 | ARC_A | B_OS Server<br>A_Software_W |
| A_OS_AP_image | 1.2 | ARC_A<br>ARC_B | A_OS<br>MW_A_L |
| A_OS_AP_image | 1.3 | ARC_A<br>ARC_B | A_OS<br>MW_A_L<br>patch_a |
| B_OS_AP_image | 1.6 | ARC_A | B_OS Server<br>MW_A_W |
| C_OS_DB_A_image | 1.0 | ARC_C | C_OS 9<br>A_Software |
| C_OS_DB_B_image | 1.0 | ARC_C | C_OS 8<br>B_Software |
| C_OS_Batch_image | 1.1 | ARC_C | C_OS 9 |

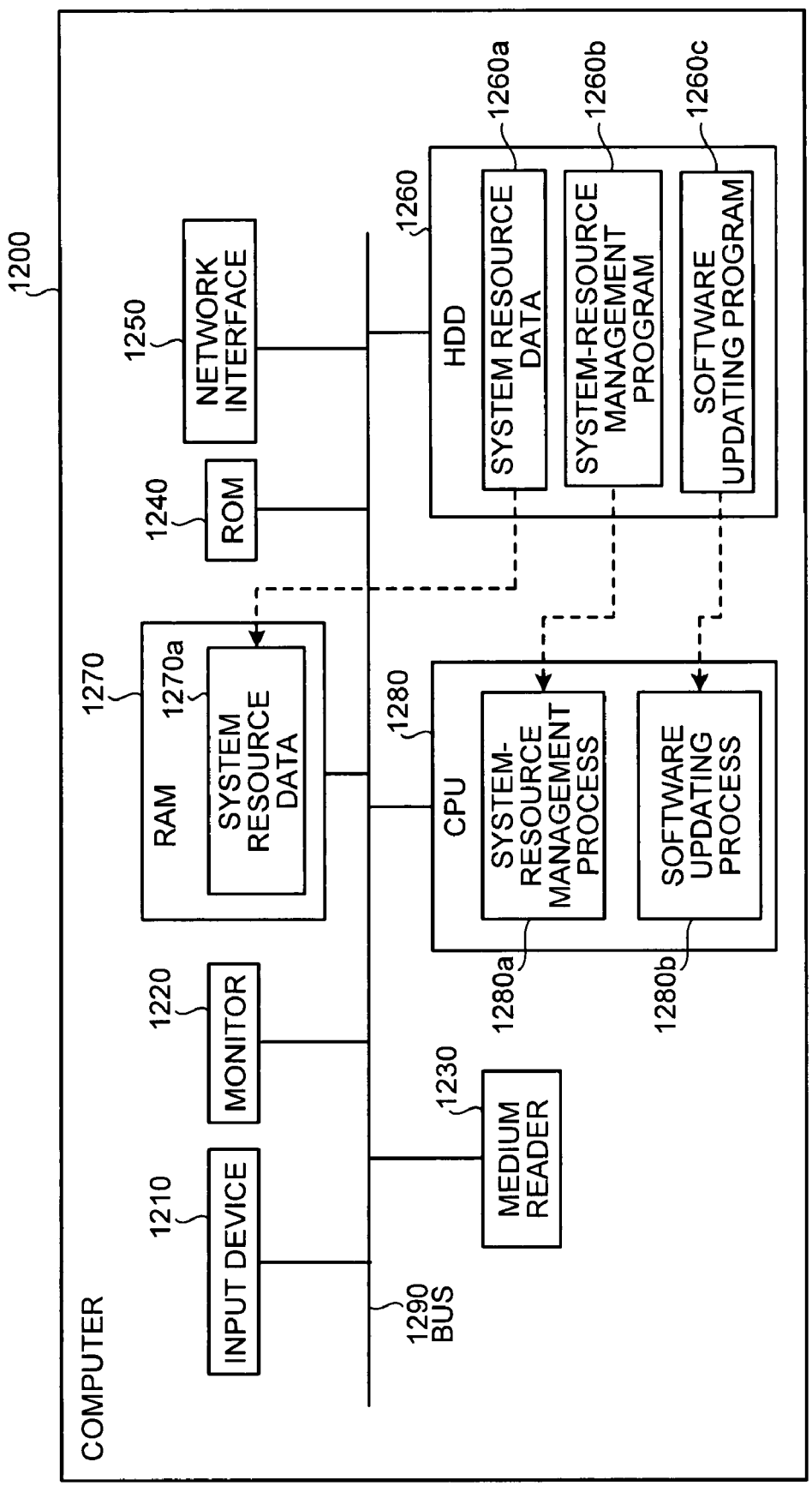

METHOD, APPARATUS, AND COMPUTER PRODUCT FOR UPDATING SOFTWARE

This is a continuation filed under 35 U.S.C. § 111(a), of International Application No. PCT/JP2004/015035, filed Oct. 12, 2004.

BACKGROUND OF THE INVENTION

1. Field of the Invention

The present invention relates to a technology for collecting various pieces of information and instructing operations by communicating with an agent installed in an information processing apparatus via a network and for updating software in the information processing apparatus, with a capability of automatically updating the software in the information processing apparatus employed in a complicated operation mode.

2. Description of the Related Art

Recently, information processing systems require a multifunction, and accordingly, some sort of problem can often lurk in the information processing system. If any problem is found in the information processing system, a remedy for the problem is generally provided in the form of a patch. The patch is a program or data that improves a problem in an information processing system, or a combination thereof.

When a patch is applied to an information processing system, it is required to follow a premised procedure, and another problem can be caused by following a wrong procedure. For example, when the patch is applied, it is sometimes required to stop a certain service in the information processing system or to apply another patch in advance.

For this reason, if there are many information processing systems and the patch needs to be applied to them, a heavy burden is put on an operator, and an erroneous operation is likely to cause a secondary failure. Therefore, inventions that make a patch-applying work more efficient and automatic have been made and disclosed (see, for example, Japanese Patent Laid-open No. 2003-296132 and Japanese Patent Laid-open No. 2003-108255).

However, as the operation mode of the information processing systems become more complicated, the patch-applying work cannot be supported enough by the conventional inventions.

For example, in a system that is required to have high throughput and high usability, servers are often operated in parallel using a load balancer. This operates a system in a mode where a plurality of servers installed with an identical application is arranged, the load balancer receives all requests from clients, and it assigns the process into any one of the servers.

By taking such operation mode, a plurality of servers can be operated as a single information processing apparatus by appearance, and increased number of the servers can improve the processing performance. Moreover, the number of the servers can be dynamically changed for the operation depending on the load status and occurrence of failures, whereby achieving high availability.

The mode using the load balancer is also advantageous in the patch-applying work. When a patch is applied, in many cases, it is necessary to stop the service of the server. In the mode using the load balancer, by performing a procedure with respect to each server, the procedure including disconnecting the server fro the load balancer to stop the service and connecting the server to the load balancer again after the patch is applied, the patch can be applied to all the servers without stopping providing the service.

The method of applying the patch to each server after being disconnected from the load balancer is referred to as a rolling application. The rolling application includes a great advantage of being able to apply the patch while the information system is in operation as described above; however, it also includes a disadvantage that erroneous operation can occur because configuration of the load balancer and the like needs to be changed and the procedure is very complicated. The inventions disclosed in Japanese Patent Laid-open No. 2003-296132 and Japanese Patent Laid-open No. 2003-108255 improve only the application of the patch, and they do not improve most part of the rolling application procedure.

The target system of the rolling application is, as described above, a system that operates servers in parallel, which is often a large-scale system. Therefore, if an erroneous operation occurs in the rolling application of the patch, an effect thereof is very likely to be very profound, and it is very important to prevent occurrence of the erroneous operation.

SUMMARY OF THE INVENTION

It is an object of the present invention to at least partially solve the problems in the conventional technology.

A computer-readable recording medium according to one aspect of the present invention stores therein a computer program for performing an information collection and an operation instruction by performing a communication with a program deployed in an information processing apparatus via a network, to perform an update of a software of the information processing apparatus. The computer program causes a computer to execute acquiring configuration information from a database that stores therein current configuration information of the information processing apparatus, post configuration information of the information processing apparatus after updating the software, and configuration information of a network device connected to the information processing apparatus via the network; changing a setting of the network device as appropriate; and software applying including determining a software to be installed in the information processing apparatus or to be removed from the information processing apparatus by comparing the current configuration information with the post configuration information acquired at the acquiring, instructing the program deployed in the information processing apparatus to install or remove the software, and instructing, when it is determined that a change of the setting of the network device is needed when installing or removing the software from the configuration information of the network device acquired at the acquiring, the changing to change the setting of the network device.

An apparatus according to another aspect of the present invention is for performing an information collection and an operation instruction by performing a communication with a program deployed in an information processing apparatus via a network, to perform an update of a software of the information processing apparatus. The apparatus includes a configuration-information acquiring unit that acquires configuration information from a database that stores therein current configuration information of the information processing apparatus, post configuration information of the information processing apparatus after updating the software, and configuration information of a network device connected to the information processing apparatus via the network; a network-configuration setting unit that changes a setting of the network device as appropriate; and a software applying unit that determines a software to be installed in the information processing apparatus or to be removed from the information processing apparatus by comparing the current configuration information with the post configuration information acquired by the configuration-information acquiring unit, instructs the program deployed in the information processing apparatus to install or remove the software, and instructs, when it is determined that a change of the setting of the network device is needed when installing or removing the software from the configuration information of the network device acquired by the configuration-information acquiring unit, the network-configuration setting unit to change the setting of the network device.

A method according to still another aspect of the present invention is for performing an information collection and an operation instruction by performing a communication with a program deployed in an information processing apparatus via a network, to perform an update of a software of the information processing apparatus. The method includes acquiring configuration information from a database that stores therein current configuration information of the information processing apparatus, post configuration information of the information processing apparatus after updating the software, and configuration information of a network device connected to the information processing apparatus via the network; changing a setting of the network device as appropriate; and software applying including determining a software to be installed in the information processing apparatus or to be removed from the information processing apparatus by comparing the current configuration information with the post configuration information acquired at the acquiring, instructing the program deployed in the information processing apparatus to install or remove the software, and instructing, when it is determined that a change of the setting of the network device is needed when installing or removing the software from the configuration information of the network device acquired at the acquiring, the changing to change the setting of the network device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram of an example of pool group data stored as information on pool groups;

FIG. 5 is a diagram of an example of server group data stored as information on a server group;

FIG. 6 is a diagram of an example of provisioning configuration data in which storage sub-groups are specified;

FIG. 7 is a diagram of an example of inter-server-group link data stored as information on the server group;

FIG. 8 is a diagram of an example of network group data stored as information on a network group;

FIG. 11 is a diagram of an example of load distribution group data stored as group information on a load balancer;

FIG. 12 is a diagram of an example of distribution management data stored as information on distribution status of a software distribution image;

FIG. 13 is a diagram of an example of software distribution image management data stored as information on the software distribution image; and FIG. 14 is a diagram of a hardware configuration of a computer that operates as the software updating apparatus shown in FIG. 3.

DETAILED DESCRIPTION OF THE PREFERRED EMBODIMENTS

Exemplary embodiments of the present invention are explained in detail below with reference to the accompanying drawings. The present invention is not limited to the embodiments.

Before starting an explanation of a software updating program, a software updating apparatus, and a software updating method according to the present invention, a resource allocation management method as a background of an embodiment of the present invention and a resource allocation management system to which the resource allocation management method is applied are explained.

Figure 1:
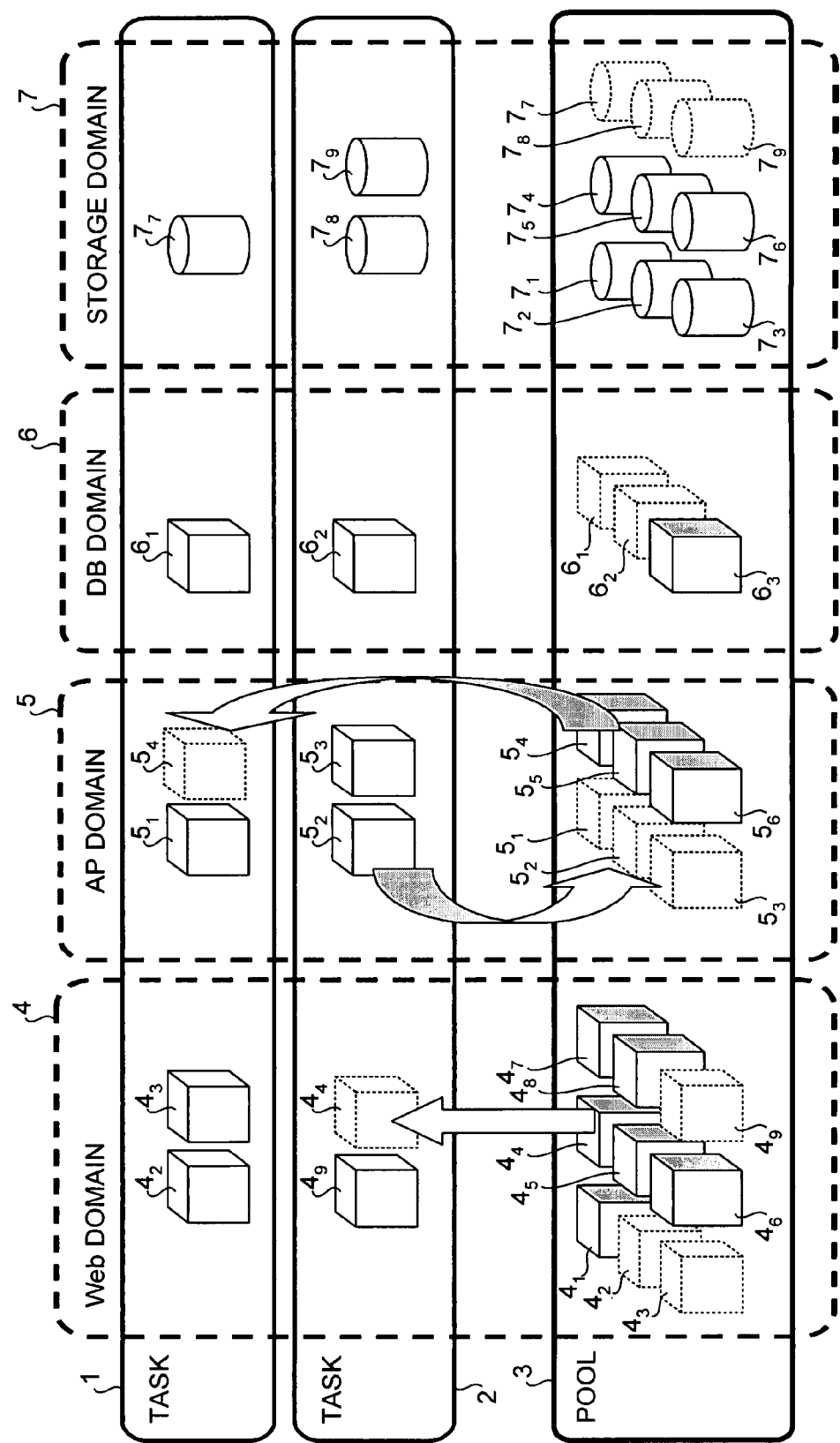
FIG. 1 is a schematic for explaining a concept of a resource allocation management method according to the present invention.

FIG. 1 is a schematic for explaining a concept of a resource allocation management method according to the present invention. Information processing apparatuses such as web servers $4_1$ to $4_9$, AP (Application) servers $5_1$ to $5_6$, DB (Database) servers $6_1$ to $6_3$, and storages $7_1$ to $7_9$ are used in FIG. 1.

The web servers $4_1$ to $4_9$ are servers that provide contents to be browsed by web browsers to client terminals via the Internet. The AP servers $5_1$ to $5_6$ are servers that take over execution of information processes requested by the web servers $4_1$ to $4_9$ that have received an information processing request from a user.

The DB servers $6_1$ to $6_3$ are servers that manage accesses to database upon receiving requests for accessing the database from the AP servers $5_1$ to $5_6$. The storages $7_1$ to $7_9$ are storage devices to be connected via a SAN to the web servers $4_1$ to $4_9$, the AP servers $5_1$ to $5_6$, and the DB servers $6_1$ to $6_3$.

With a resource-assignment managing system, which is a background of the embodiment, a resource group that contains servers or storages having a uniform physical wire connection to other devices is managed as a domain in a LAN (local area network), a SAN, or the like.

For example, in the case shown in FIG. 1, server groups used for tasks 1 and 2 are managed as a web domain 4, an AP domain 5, and a DB domain 6, while a storage group used for the tasks 1 and 2 is managed as a storage domain 7.

In this case, the web servers $4_1$ to $4_9$ that belong to the web domain 4 have uniform connections to other devices, the AP servers $5_1$ to $5_6$ that belong to the AP domain 5 have uniform connections to other devices, the DB servers $6_1$ to $6_3$ that belong to the DB domain 6 have uniform connections to other devices, and the storages $7_1$ to $7_9$ that belong to the storage domain 7 have uniform connections to other devices.

With the resource-assignment managing process, unused ones of the web servers $4_1$ to $4_9$, the AP servers $5_1$ to $5_6$, the DB servers $6_1$ to $6_3$, and the storages $7_1$ to $7_9$ are registered to a pool 3 for each domain. The web servers $4_1$ to $4_9$, the AP servers $5_1$ to $5_6$, the DB servers $6_1$ to $6_3$, and the storages $7_1$ to $7_9$ are assigned to each of the tasks 1 and 2 as appropriate.

For example, in the example of FIG. 1, the web servers $4_2$ and $4_3$, the AP server $5_1$, the DB server $6_1$, and the storage $7_7$ are assigned to the task 1, while the web server $4_9$, the AP servers $5_2$ and $5_3$, the DB server $6_2$, and the storages $7_8$ and $7_9$ are assigned to the task 2.

If load on the web servers $4_2$, $4_3$, $4_9$, the AP servers $5_1$, $5_2$, $5_3$, and the DB servers $6_1$, $6_2$ assigned to the tasks 1 and 2 increases, or if storage capacity of the storages $7_7$ to $7_9$ is not enough, the web servers $4_1$, $4_4$ to $4_8$, the AP servers $5_4$ to $5_6$, the DB server $6_3$, and the storages $7_1$ to $7_6$ registered to the pool 3 are added as servers available for the task.

Specifically, by introducing a software required for the web servers $4_1$, $4_4$ to $4_8$, the AP servers $5_4$ to $5_6$, and the DB server $6_3$ registered to the pool 3 and automatically executing setting of the network and the like, the web servers $4_1$, $4_4$ to $4_8$, the AP servers $5_4$ to $5_6$, and the DB server $6_3$ are added as the servers available for the task.

When adding the storages $7_1$ to $7_6$, the storages $7_1$ to $7_6$ are added as the storages $7_1$ to $7_6$ available for the task by automatically executing setting of logical volumes and setting of the network for the storages $7_1$ to $7_6$.

For example, in FIG. 1, the web server $4_4$ that was registered to the pool 3 is added to the web domain 4 of the task 2.

Moreover, according to the resource allocation management method, if the web servers $4_2$, $4_3$, $4_9$, the AP servers $5_1$ to $5_3$, the DB servers $6_1$, $6_2$, or the storages $7_7$ to $7_9$ used for the tasks 1 and 2 are not used for a long time, the web servers $4_2$, $4_3$, $4_9$, the AP servers $5_1$ to $5_3$, the DB servers $6_1$, $6_2$, and the storages $7_7$ to $7_9$ are excluded from the servers available for the task and registered to the pool 3.

The web servers $4_2$, $4_3$, $4_9$, the AP servers $5_1$ to $5_3$, the DB servers $6_1$, $6_2$, and the storages $7_7$ to $7_9$ registered to the pool 3 are to be used if the load on the web servers $4_2$, $4_3$, $4_9$, the AP servers $5_1$ to $5_3$, and the DB servers $6_1$, $6_2$, used for other tasks 1 and 2 increases or if the storage capacity of the storages $7_7$ to $7_9$ is not enough.

Specifically, by deleting the software introduced to the web servers $4_2$, $4_3$, $4_9$, the AP servers $5_1$ to $5_3$, and the DB servers $6_1$, $6_2$ and automatically changing setting of the network and the like, the web servers $4_2$, $4_3$, $4_9$, the AP servers $5_1$ to $5_3$, and the DB servers $6_1$, $6_2$ are excluded from the servers available for the tasks 1 and 2 and registered to the pool 3.

Moreover, to exclude the storages $7_7$ to $7_9$ from the storages available for the tasks 1 and 2 and to register them to the pool 3, by automatically executing setting of the network to the storages $7_7$ to $7_9$, the storages $7_7$ to $7_9$ can be excluded from the storages available for the tasks 1 and 2 and registered to the pool 3.

For example, in FIG. 1, the AP server $5_2$ that was registered to the pool 3 is excluded from the servers available for the task in the AP domain 5 of the task 2, and it is registered to the pool 3. The server $5_4$ registered to the pool 3 is reused in such a case that the load on the server $5_1$ used for the task 1 increases, and it is added to the task 1.

Figure 2:
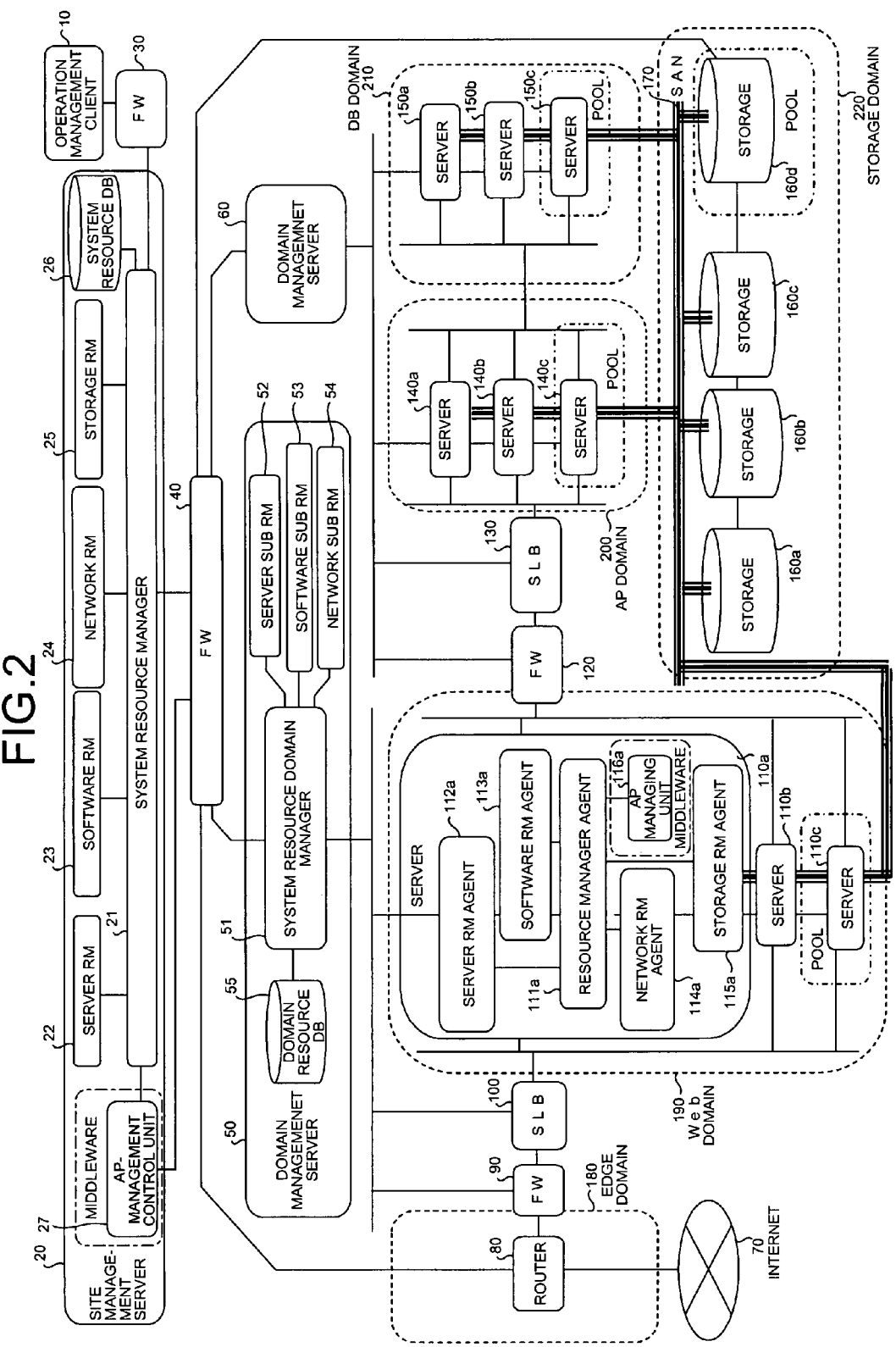
FIG. 2 is a diagram of a functional configuration of the resource allocation management system according to an embodiment of the present invention.

FIG. 2 is a diagram of the functional configuration of the resource allocation management system that supports the embodiment.

As shown in FIG. 2, in the resource-assignment managing system, an operation management client 10 is connected to a site management server 20 via an FW (firewall) 30 over a network. The site management server 20 is connected over the network to domain management servers 50 and 60 via an FW 40.

Furthermore, the site management server 20 is connected over the network to a router 80 that belongs to an edge domain 180 via the FW 40. The site management server 20 is also connected over the network to storages 160a to 160c that belong to a storage domain 220, and to a storage 160d that is pooled via the FW 40.

The domain management server 50 is connected over the network to an SLB (server load balancer) 100 and to servers 110a to 110c that belong to a web domain 190.

Furthermore, the domain management server 60 is connected over the network to an FW 120, an SLB 130, servers 140a to 140c that belong to an AP domain 200, servers 150a to 150c that belong to a DB domain 210.

The storages 160a to 160c that belong to the storage domain 220, and the storage 160d that is pooled are also connected via a SAN 170 to the servers 110a to 110c that belong to the web domain 190, the servers 140a to 140c that belong to the AP domain 200, and the servers 150a to 150c that belong to the DB domain 210.

In this case, the operation management client 10 is a client terminal that receives various settings related to resource management from a user and transmits information to the site management server 20, and that receives various output results from the site management server 20 and displays the output results on a monitor or the like.

The site management server 20 is a server that performs the resource-assignment managing system described in FIG. 1 in cooperation with the domain management servers 50 and 60. The site management server 20 includes a system resource manager 21, a server RM (resource manager) 22, a software RM 23, a network RM 24, a storage RM 25, a system resource DB 26, and an AP-management control unit 27.

The system resource manager 21 is a managing unit that receives various setting information related to the resource-assignment managing process from the operation management client 10, and operates resources in cooperation with the server RM 22, the software RM 23, the network RM 24, and the storage RM 25. In addition, the system resource manager 21 performs data reception and data transmission between the domain management servers 50 and 60.

The server RM 22 is a managing unit that performs a boot and a shutdown of each of the servers 110a to 110c, 140a to 140c, and 150a to 150c, a collection of information about hardware, a setting, and the like. The server RM 22 performs the above processes in cooperation with a server sub RM 52 of the domain management server 50, and a server RM agent 112a of the server 110a.

The software RM 23 is a managing unit that performs software installation, setting, collection of information about the software, and the like for each of the servers 110a to 110c, 140a to 140c, and 150a to 150c. The software RM 23 performs the above processes in cooperation with a software sub RM 53 of the domain management server 50, and a software RM agent 113a of the server 110a.

The network RM 24 is a managing unit that performs information collection, setting, and the like related to the network. The network RM 24 performs the above processes in cooperation with a network sub RM 54 of the domain management server 50, and a network RM agent 114a of the server 110a.

The storage RM 25 is a managing unit that performs information collection, setting, and the like related to the storages 160a to 160c that belong to the storage domain 220, and relate to the storage 160d that is pooled. The storage RM 25 manages the storages 160a to 160c and the storage 160d pooled without involving the domain management servers 50 and 60.

The system resource DB 26 is a database that contains various resource information managed by the system resource manager 21, the server RM 22, the software RM 23, the network RM 24, and the storage RM 25. Details of stored data are explained later.

The AP-management control unit 27 is a processing unit that controls and manages an AP managing unit 116a. More specifically, the AP-management control unit 27 sends a request for executing process related to an application such as installation and setting to the AP managing unit 116a. Functions of the AP-management control unit 27 are realized by executing middleware installed on the site management server 20.

The domain management servers 50 and 60 are servers that manage resources in a domain or a plurality of domains. The domain management server 50 includes a system resource domain manager 51, the server sub RM 52, the software sub RM 53, the network sub RM 54, and a domain resource DB 55.

The domain management server 60 includes the same function units as the function units of the domain management server 50, and therefore, the function units of the domain management server 60 are not shown in FIG. 2 and explanations thereof are omitted.

The system resource domain manager 51 is a managing unit that performs information collection, setting process, and the like related to resources that belong to each of the domains in cooperation with the server sub RM 52, the software sub RM 53, and the network sub RM 54.

Furthermore, the system resource domain manager 51 performs data reception and data transmission to and from networking equipment such as the site management server 20, an FW 90, and the SLB 100, as well as to and from the servers 110a to 110c to be managed.

The server sub RM 52 is a managing unit that performs boot, shutdown, collection of information about hardware, setting, and the like in cooperation with the server RM 22 and the server RM agent 112a.

The software sub RM 53 is a managing unit that performs software installation, setting, collection of information about software, and the like for each of the servers 110a to 110c in cooperation with the software RM 23 and the software RM agent 113a.

The network sub RM 54 is a managing unit that performs information collection, setting, and the like related to a network in cooperation with the network RM 24 and the network RM agent 114a.

The domain resource DB 55 is a database that stores therein information acquired from the servers 110a to 110c and the system resource DB 26, when the server sub RM 52, the software sub RM 53, or the network sub RM 54 collects various information or specifies settings related to the servers 110a to 110c to be managed. In addition, the domain resource DB 55 stores therein a virtual OS (operating system) used for network boot of the servers 110a to 110c.

The router 80 is networking equipment that performs routing of data packets in data communication via the Internet 70. The FWs 30, 40, 90, and 120 are networking equipments that prevent unauthorized access to each of the servers 110a to 110c, 140a to 140c, and 150a to 150c.

The SLBs 100 and 130 are load balancers that distribute and transfer information-processing requests for the servers 110a to 110c or 140a to 140c to a plurality of the servers 110a to 110c or 140a to 140c. Although switches are also connected in upstream sides and downstream sides of the SLBs 100 and 130, the switches are not shown in FIG. 2.

The servers 110a to 110c, 140a to 140c, and 150a to 150c are servers that perform various information processes. The server 110a includes a resource manager agent 111a, the server RM agent 112a, the software RM agent 113a, the network RM agent 114a, a storage RM agent 115a, and the AP managing unit 116a.

The servers 110b, 140a, 140b, 150a, and 150b include the same function units as those of the server 110a. Therefore, the function units of the servers 110b, 140a, 140b, 150a, and 150b are not shown in FIG. 2, and explanations thereof are omitted.

The servers 110c, 140c, and 150c are servers that are pooled, and do not include each of the resource manager agent 111a, the server RM agent 112a, the software RM agent 113a, the network RM agent 114a, the storage RM agent 115a, and the AP managing unit 116a.

When the server 110c, 140c, or 150c is set as a server available for tasks, a computer program that realizes each of the function units is installed on the server 110c, 140c, or 150c and is executed to realize each of the function units.

The resource manager agent 111a is an agent that receives a request for executing process such as setting and information collection from the domain management server 50 of the system resource domain manager 51 for the server 110a, and performs processes in cooperation with the server RM agent 112a, the software RM agent 113a, the network RM agent 114a, and the storage RM agent 115a.

The server RM agent 112a is an agent that performs a boot and a shutdown of the server 110a, a collection of information about hardware, a setting, and the like. The software RM agent 113a is an agent that performs software installation, setting, and collection of information about software for the server 110a.

The network RM agent 114a is an agent that performs information collection, setting, and the like related to a network connected to the server 110a. The storage RM agent 115a is an agent that performs information collection, setting, and the like related to a storage connected to the server 110a.

The storages 160a to 160c are storages used by the servers 110a to 110c that belong to the web domain 190, the servers 140a to 140c that belong to the AP domain 200, and the servers 150a to 150c that belong to the DB domain 210. The storage 160d is a storage that is pooled. The storages 160a to 160d are constituted of RAID devices.

A VLAN (virtual local area network) is set as a network that connects between the servers 110a to 110c that belong to the web domain 190, the servers 140a to 140c that belong to the AP domain 200, and the servers 150a to 150a that belong to the DB domain 210.

Figure 3:
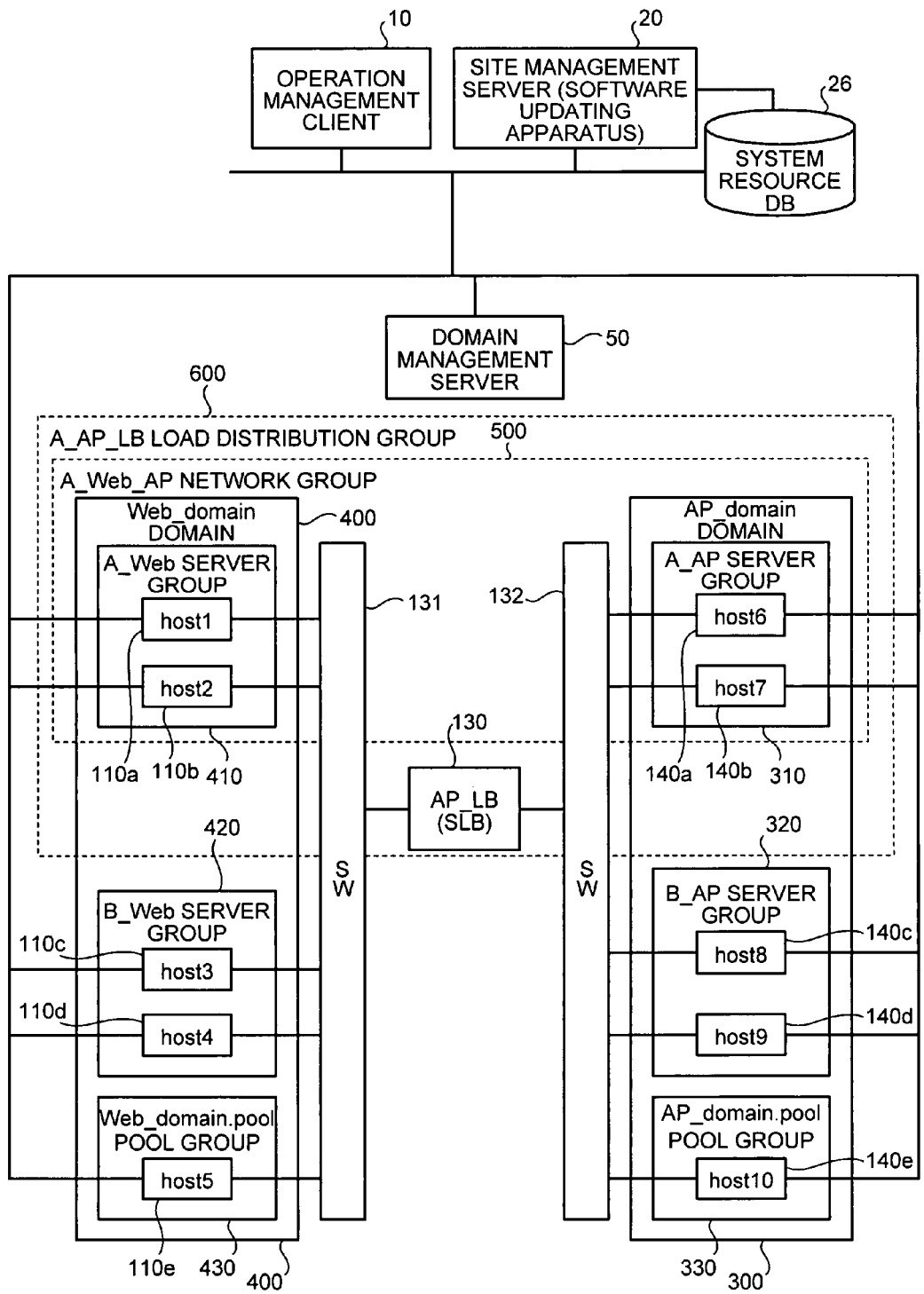
FIG. 3 is a diagram of an example of a network to which a software updating apparatus according to the embodiment is connected.

FIG. 3 is a diagram of an example of the network to which the software updating apparatus according to the embodiment is connected.

As shown in FIG. 3, the site management server 20 is supposed to function as the software updating apparatus. It is also possible to configure the software updating apparatus as an independent information processing apparatus, and it is also possible to configure a domain management server such as the domain management server 50 to function as the software updating apparatus.

A software updating apparatus 20, which is the site management server, includes the system resource DB 26 that stores therein management information of each device that configures the network, and it is connected to the operation management client 10, the domain management server 50, the servers 110a to 110e, and the servers 140a to 140e via the network.

The servers 110a to 110e and the servers 140a to 140e connected to the software updating apparatus 20 are grouped based on a plurality of grouping systems according to the management purpose. One system is to group them based on a physical identity of the domain as explained above. In this example, the servers 110a to 110e are grouped into a Web_domain domain 400, and the servers 140a to 140e are grouped into an AP_domain domain 300.

They are further grouped in each domain. As already explained, the servers that are not used for the task are grouped into a group referred to as a pool group. For example, in the AP_domain domain 300, the server 140e is grouped into an AP_domain.pool pool group 330.

In the system resource DB 26, what pool groups are present in the domain is managed by pool group data 710. FIG. 4 is a diagram of an example of the pool group data 710 stored as information on the pool groups. The pool group data 710 includes information on a pool group name, a type, and a server domain name.

The pool group name is identification information of the pool of the servers described above. The type is information indicative of whether the pool group is to be shared by a plurality of server groups or to be allowed for a certain server group to use. The server domain name is identification information of the domain.

On the other hand, the server used for the task is grouped into a group referred to as a server group. The server group is a group based on a software identity, and the servers that belong to the same server group include an identical software configuration. A plurality of the server groups can be generated in the domain, and there are two server groups in the AP_domain domain 300, which are an A_AP server group 310 and a B_AP server group 320. In this example, the servers 140a and 140b are grouped into the former server group, and the servers 140c and 140d are grouped into the latter server group.

In the system resource DB 26, what server groups are present in the domain is managed by server group data 720. FIG. 5 is a diagram of an example of the server group data 720 stored as information on the server groups. The server group data 720 includes information on a server group name, the server domain name, a software-distribution image name, a version, a storage template name, SAN boot, and automatic recovery.

The server group name is identification information of the server group. The server domain name is information of the server domain to which the server group belongs. The software-distribution image name is information for identifying an image file of the software distributed to the server that belongs to the server group. The version is information on the version of the software distribution image that should currently be delivered to the server that configures the server group. Other items are unnecessary for explaining the embodiment, and the explanation thereof is omitted.

Which server belongs to which server group or pool group is managed by provisioning configuration data 730. FIG. 6 is a diagram of an example of the provisioning configuration data 730 in which storage sub-groups are specified. The provisioning configuration data 730 includes information on the server name, the pool group name, the storage sub-group name, and accessibility.

The server name is identification information of the server, i.e., a host name. The group name is identification information of the pool to which the server belongs, and it is specified only when the server belongs to a pool. The server group name is identification information of the server group to which the server belongs, and it is set only when the server belongs to a server group. Other items are unnecessary for explaining the embodiment, and the explanation thereof is omitted.

The server group belongs to a group referred to as a network group apart from the domain. The network group is a group of server groups that communicate with one another to provide the service, i.e., the server groups associated with one another in terms of the task. In the example shown in FIG. 3, a A_Web server group 410 and the A_AP server group 310 belong to a network group referred to as an A_Web_AP network group 500.

In the system resource DB 26, which server group belongs to which network group is managed by inter-server-group link data 740. FIG. 7 is a diagram of an example of the inter-server-group link data 740 stored as information on the server groups. The inter-server-group link data 740 includes information on a front server-group name, a network group name, and a back server-group name.

The front server-group name is information indicative of the server group that requests a process among the server groups linked by the network group. The network group name is identification information for identifying the network group. The back server-group name is information indicative of the server group that executes the requested process and replies to a requester among the server groups linked by the network group.

The network group belongs to a still upper-level group referred to as a load distribution group. The load distribution group is a group for associating a load balancer with a network group on which the load balancer performs the load distribution. The load balancer is a device that receives requests for processing to all the servers that includes an identical configuration and assigns the requests for processing to a server with the lightest load based on a predetermined rule.

In FIG. 3, the A_Web_AP network group 500 is linked to the SLB 130 (A_LB), and configures a load distribution group referred to as an A_AP_LB load distribution group 600.

As for the A_Web server group 410 and the A_AP server group 310 that belong to the A_Web_AP network group 500, the former is the front-end and the latter is the back-end, and therefore the SLB 130 is to receive requests from the servers that belong to the A_Web server group 410 and to assign the process to the servers with the lighter load among those belonging to the A_AP server group 310. As described above, because the servers that belong to the same server group have the same physical and software identity, the same processing result is acquired no matter which server the process is assigned to.

In the system resource DB 26, which network group belongs to which load distribution group is managed by network group data 750. FIG. 8 is a diagram of an example of the network group data 750 stored as information on the network groups. The network group data 750 includes information on the network group name, a network domain name, a front-network sub-group name, a load distribution group name, and a back-network sub-group name.

The network group name is identification information of the network group. The load distribution group name is identification information of the load distribution group. Other items are unnecessary for explaining the embodiment, and the explanation thereof is omitted.

In this manner, in the network configuration of the network to which the software updating apparatus according to the embodiment is connected, configuration of various devices including the load balancer is managed by grouping them, and various configuration information is stored in the system resource DB 26.

In the network shown in FIG. 3, it is assumed that business LAN (VLAN) is established so that no communication is performed between servers that are not related in terms of business in view of information security protection and the like.

Figure 9:
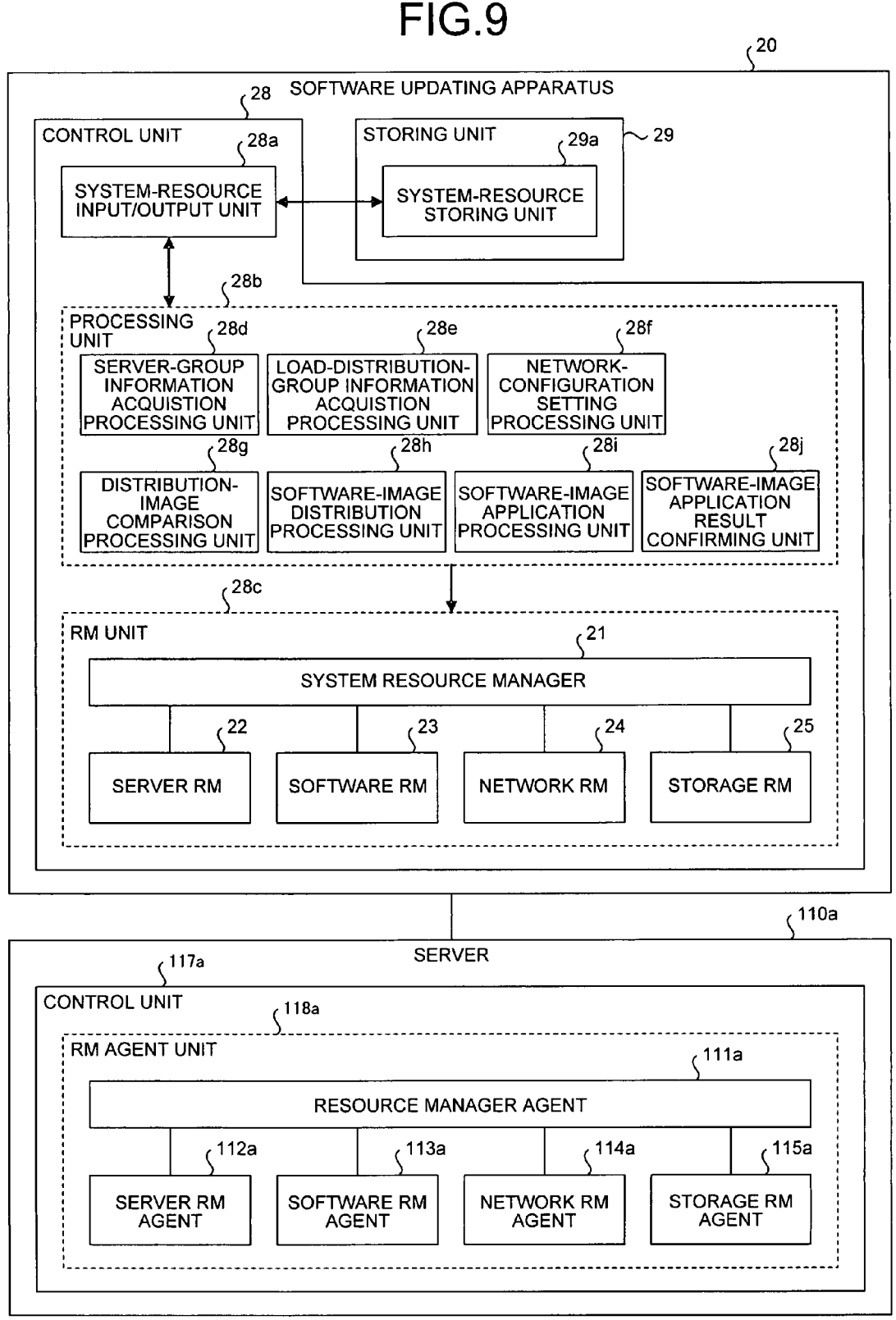
FIG. 9 is a functional block diagram of a functional configuration of the software updating apparatus according to the embodiment.

FIG. 9 is a functional block diagram of a functional configuration of the software updating apparatus according to the embodiment. As shown in the drawing, the software updating apparatus 20 is configured to be connected to the server 110a that is to be updated via the network. Although a single server to be updated is shown in the drawing, other similar servers can be connected via the network.

The software updating apparatus 20 includes a control unit 28 and a storing unit 29. The storing unit 29 stores therein various information, and includes a system-resource storing unit 29a. The system-resource storing unit 29a corresponds to the system resource DB 26. The system-resource storing unit 29a does not necessarily have to be built in the software updating apparatus 20. The system-resource storing unit 29a can be configured so that a part or all of it is present in another server and that the software updating apparatus 20 inputs and outputs information via the network.

The control unit 28 controls the entire software updating apparatus 20, and includes a system-resource input/output unit 28a, a processing unit 28b, and an RM unit 28c. The system-resource input/output unit 28a controls input and output of data to and from the system-resource storing unit 29a.

The RM unit 28c includes the system resource manager 21, the server RM 22, the software RM 23, the network RM 24, and the storage RM 25 that were already explained, and executes collection and setting of various information on the server 11a in association with the resource manager agent 111a, the server RM agent 112a, the software RM agent 113a, the network RM agent 114a, and the storage RM agent 115a in the server 110a.

The processing unit 28b processes various operations related to software update, and includes a server-group information acquisition processing unit 28d, a load-distribution-group information acquisition processing unit 28e, a network-configuration setting processing unit 28f, a distribution-image comparison processing unit 28g, a software-image distribution processing unit 28h, a software-image application processing unit 28i, and a software-image application result confirming unit 28j.

The server-group information acquisition processing unit 28d acquires information on the servers that configure the server group to be updated with the software from the system-resource storing unit 29a via the system-resource input/output unit 28a. The load-distribution-group information acquisition processing unit 28e acquires information on the load distribution group that includes the server group to be updated with the software from the system-resource storing unit 29a via the system-resource input/output unit 28a.

The network-configuration setting processing unit 28f sets the load balancer and the VLAN by calling functions of various RMs to temporarily disconnect and reconnect the server to be updated with the software from and to a business server.

The distribution-image comparison processing unit 28g acquires information on the latest software distribution image applied to the server to be updated with the software and information on the software distribution image associated with the server group to be updated with the software from the system-resource storing unit 29a via the system-resource input/output unit 28a, and compares the information.

The software distribution image is a combination of software images that have been applied or that are to be applied. The software image is data that packs a patch or a disk image to which the patch has been applied, an installation program, an uninstall program, and an application-result confirming program.

The software-image distribution processing unit 28h transfers the software image stored in a predetermined location in advance to the server to be updated with the software by calling the functions of various RMs. The software-image application processing unit 28i calls the functions of the various RMs and has them execute the installation program or the uninstall program included in the transferred software image.

The software-image application result confirming unit 28j calls the functions of the various RMs and has them execute the application-result confirming program included in the transferred software image. The application-result confirming program is a test program generated based on a predetermined specification, and an exclusive one is prepared with respect to each software image in principle.

In this manner, the software updating apparatus 20 is configured so that the processing unit 28b calls the functions of the various RMs and has them execute various operations of the software updating process as needed while referring to the information in the system-resource storing unit 29a.

Next, a processing procedure performed by the software updating apparatus shown in FIG. 9 is explained. At first, a processing procedure for performing a rolling application of a patch on a server is explained.

As a premise of the explanation, version 1.2 of A_OS_AP_Image is applied to each server in the A_AP server group 310 as the latest software distribution image. It is also premised that version 1.3 of the software distribution image A_OS_AP_Image added with a patch to be applied to the version 1.2 of the software distribution image A_OS_AP_Image has been generated, and that it has been registered to the system resource DB 26 as the latest software distribution image for the A_AP server group 310.

Figure 10:
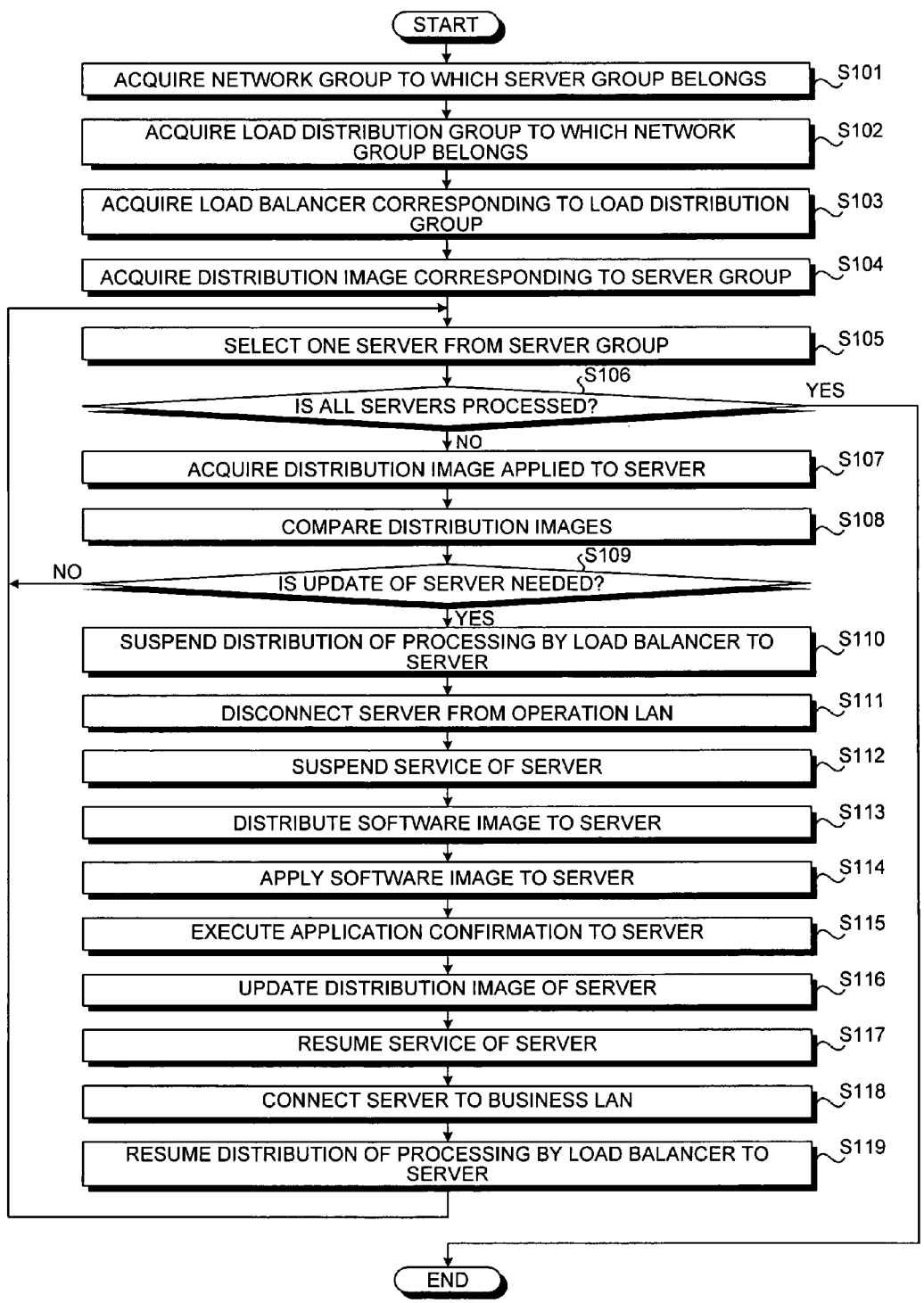
FIG. 10 is a flowchart of processing procedure performed by the software updating apparatus shown in FIG. 9.

FIG. 10 is a flowchart of a processing procedure performed by the software updating apparatus 20 shown in FIG. 9. The software updating process starts when a user selects the server group to be updated and instructs the start of the software updating process by operating the operation management client 10. It is assumed herein that the user selects the A_AP server group 310 and starts the software updating process.

Upon receiving the instruction to start the software updating process, the load-distribution-group information acquisition processing unit 28e acquires the information on the load distribution group to which the specified server group belongs.

Specifically, referring to the inter-server-group link data 740, it acquires the network group name in which the specified server group is a back server group (step S101), and, referring to the network group data 750, acquires the load distribution group name corresponding to the acquired network group name (step S102).

Referring to load distribution group data 760, it acquires a load balancer name corresponding to the acquired load distribution group name (step S103). FIG. 11 is a diagram of an example of the load distribution group data 760 stored as group information on the load balancer. The load distribution group data 760 includes information on the load distribution group name, the load balancer name, and representative IP.

The load distribution group name is information for identifying the load distribution group. The load balancer name is a name for identifying the load balancer. The representative IP is information on an IP address assigned to each load distribution group.

If the server group specified as the target of the software updating process is the A_AP server group 310, A_Web-AP is acquired as the network group name, A_AP_LB is acquired as the load distribution group name, and AP_LB is acquired as the load balancer name.

When acquisition of the information on the load distribution group is completed, the distribution-image comparison processing unit 28g acquires information on the software distribution image associated with the server group to be processed. Specifically, referring to the server group data 720, it acquires the software-distribution image name and the version corresponding to the specified server group (step S104).

If the server group specified as the target of the software updating process is the A_AP server group 310, A_OS_AP_image is acquired as the software-distribution image name, and 1.3 is acquired as the version.

When acquisition of the software distribution image associated with the server group is completed, the server-group information acquisition processing unit 28d selects the server to be processed.

Specifically, referring to the provisioning configuration data 730, it acquires one of the servers that has not been updated with the software among the servers whose server group name matches the specified server group (step S105). If the server that has not been updated with the software is not present (YES at step S106), the process is terminated; otherwise (NO at step S106), the later process is continued.

If the server group specified as the target of the software updating process is the A_AP server group 310, a host 6 and a host 7 are to be serially selected, and it is assumed herein that the host 6 is selected at first.

When the server to be processed is selected, the distribution-image comparison processing unit 28g acquires information on the software distribution image that has been applied to the server to be processed, and compares it with the information on the software distribution image associated with the server group.

Specifically, referring to distribution management data 770, it acquires the software-distribution image name and the version corresponding to the server selected at the step S105 (step S107), and compares it with the information acquired at the step S105 (step S108). If both of the software-distribution image name and the version match (NO at step S109), it is not necessary to update the software, and therefore the process returns to the step S105 and moves to another server. Otherwise (YES at step S109), the software updating process is executed.

FIG. 12 is a diagram of an example of the distribution management data 770 stored as information on distribution status of the software distribution image. The distribution management data 770 includes information on the server name, the storage sub-group, the software-distribution image name, the version, and the status.

The server name is information for identifying the server. The storage sub-group name is information for identifying a sub-group of a storage device in which the software distribution image is developed. The software-distribution image name is information for identifying the software distribution image that has been applied to the server. The version is information on the version of the software distribution image that has been applied to the server. The status is information indicative of the distribution status of the software distribution image.

If the server to be processed is the host 6, A_OS_AP_image is acquired as the software-distribution image name, and 1.2 is acquired as the version. In this case, because the version is different from the information associated with the server group, it is determined that the host 6 needs to be updated with the software.

When it is determined that the software needs to be updated, the network-configuration setting processing unit 28f disconnects the target server from the business network. Specifically, it instructs the load balancer acquired at the step S103 to suspend from assigning the process to the server (step S110). Moreover, it disconnects the server from the business LAN (step S111).

When disconnection from the network is completed, the software-image distribution processing unit 28h and the software-image application processing unit 28l update the software. Specifically, they stop the service operating on the software (step S112), deliver necessary software image to the server (step S113), and apply it (step S114).

What software image needs to be applied is determined by referring to software distribution image management data 780. FIG. 13 is a diagram of an example of the software distribution image management data 780 stored as information on the software distribution image. The software distribution image management data 780 includes information on the software-distribution image name, the version, a server architecture name, and a software image/snapshot name.

The software-distribution image name is a name of the software distribution image. The version is the version of the software distribution image. The server architecture name is identification information for identifying a CPU architecture of the server to which the software distribution image is distributed. The software image/snapshot name is identification information for identifying a software image or a snapshot included in the software distribution image.

Comparing the versions 1.2 and 1.3 of the software distribution image A_OS_AP_image, a software image patch_a is added to 1.3. From this, it is apparent that the patch_a needs to be applied to update the version of the software distribution image A_OS_AP_image in the host 6 to 1.3 associated with the server group.

When application of the necessary software image is completed, the software-image application result confirming unit 28j executes the application_result confirming program corresponding to the software image, collects the result thereof (step S115), and, after confirming that the result is OK, updates the distribution management data 770 to the status in which the software has been updated (step S116). If the service of the server needs to have been resumed for executing the application-result confirming program, the steps S115 and S116 can be executed after a step S117.

The software-image application processing unit 28l resumes the service of the server (step S117), the network-configuration setting processing unit 28f reconnects the server to the business LAN (step S118), and it instructs the load balancer to resume assigning the process to the server (step S119). When the software updating process on a single server is completed in this manner, the process resumes from the step S105 to update another server.

As described above, because the software updating apparatus according to the embodiment executes the software updating process using the system resource information managed in a manner integrated with network devices, the total process can be automated even if the procedure is as complicated as the rolling application.

By the way, after updating the software, it is sometimes necessary to return the status to the status before the update for some reason. For example, it is when a patch is found to have a defect after the patch is applied. Even such a case can be corrected using this processing procedure.

It is assumed that the software has been updated in each server in the A_AP server group 310 to apply version 1.3 of the software distribution image A_OS_AP_image, and then it needs to be returned to version 1.2. In this case, it is necessary only to return the version of the software distribution image corresponding to the A_AP server group in the server group data 720 to 1.2 and to instruct start of the software updating process from the operation management client 10.

By doing so, the version associated with the server group differs from the version in the server, and therefore, it is determined that each server in the A_AP server group 310 needs to be updated with the software at the step S108. At the steps S114 and S115, by comparing the information in the software distribution image management data 780, it is determined that the patch_a needs to be deleted, and the uninstall program for the software image is executed.

This processing procedure can be used for software configuration when a server is added to the server group. As already explained, there are pools in a domain, and an unused server belongs to it. If load on any one of the server groups in the domain increases, the load can be reduced by adding the server in the pool to the server group with the heavy load.

When a server is added to the server group, the software configuration in the server to be added needs to be identical to that in other servers in the server group. If a long time has passed since other servers were configured, it is a very difficult work to manually configure a server with the identical software configuration including application of patches, and an erroneous operation is likely to occur such as omission to apply a patch.

However, if the software updating apparatus according to the embodiment is used, a necessary software image is automatically introduced and an unnecessary software image is automatically deleted so that it is configured exactly as the software distribution image associated with the server group only by moving the server in the pool to the server group and having it execute the software updating process.

As described above, unlike manual addition, the software updating method according to the embodiment is advantageous for addition of servers, which does not cause erroneous operations, and the work time is short.

To leave the server belonging to the pool, it can be configured to have the same software configuration as a certain server group in expectation of the application. By doing so, when the load on the server group increases, the server belonging to the pool can be added and operated in a short time.

Even when such an operation is performed, to apply a patch to the server, if the patch is applied to only the servers in the server group in operation and the patch is not applied to the server in the pool, there can be a mismatch of software configuration when the server is added and a trouble can occur.

However, if the software updating apparatus according to the embodiment is used, such a problem does not occur because the software configuration identical to other servers is automatically configured only by moving the server in the pool to the server group and having it execute the software updating process.

Various processes explained in the above-described embodiment can be realized by executing a prepared program on a computer. An example of the computer that executes the software updating program is explained below using FIG. 14.

FIG. 14 is a diagram of a hardware configuration of a computer 1200 that operates as the software updating apparatus 20 shown in FIG. 3. The computer 1200 is configured with an input device 1210 that receives data input from the user, a monitor 1220, a medium reader 1230 that reads a program from a recording medium that stores therein various programs, a ROM (Read Only Memory) 1240, a network interface 1250 that exchanges data with other computers via the network, an HDD (Hard Disk Drive) 1260, a RAM (Random Access Memory) 1270, and a CPU (Central Processing Unit) 1280, each connected with a bus 1290.

The HDD 1260 stores therein programs that realize same functions as the software updating apparatus 20, i.e., a system-resource managing program 1260*b* and a software updating program 1260*c* shown in FIG. 14.

The system-resource managing program 1260*b* and the software updating program 1260*c* can be integrated or disintegrated as needed to be stored.

By the CPU 1280 reading the system-resource managing program 1260*b* and the software updating program 1260*c* from the HDD 1260 and executing them, they function as a system-resource managing process 1280*a* and a software updating process 1280*b*.

The system-resource managing process 1280*a* corresponds to the system resource manager 21, the server RM 22, the software RM 23, the network RM 24, and the storage RM 25 shown in FIG. 3. The software updating process 1280*b* corresponds to the processing unit 28*b* shown in FIG. 3.

The HDD 1260 stores therein system resource data 1260*a*. The system resource data 1260*a* corresponds to various data stored in the system resource DB 26 shown in FIG. 3.

The CPU 1280 stores therein various data related to management of the resources as the system resource data 1260*a*, reads the system resource data 1260*a* from the HDD 1260, stores it in the RAM 1270, and executes various data processes based on system resource data 1270*a* stored in the RAM 1270.

As described above, according to the embodiment, the system resource DB 26 stores therein configuration information including the network devices such as the load balancer and the software updating process is performed based on the information stored in it. Therefore, a software updating process as complicated as the rolling application of a patch to servers that operate in parallel via the load balancer can be automated, whereby preventing occurrence of a trouble due to an erroneous operation.

Although the embodiment of the present invention was explained above, the present invention can be carried out based on various embodiments other than the above-described embodiment within the scope of the technical concept described in claims.

For example, although the case of updating software in a server was described in the embodiment, it is possible to update software in a client such as a personal computer.

Moreover, among the various processes explained in the embodiment, all or part of the processes explained to be automatically executed can be manually executed. Otherwise, all or part of the processes explained to be manually executed can be automatically executed using a known method.

In addition, the processing procedures, controlling procedures, specific names, information including various data and parameter described above or shown in the drawings can be changed as needed unless otherwise specified.

The structural elements in the devices shown in the drawings are based on a functional concept, and they do not have to be physically configured as shown in the drawings. In other words, a specific configuration of disintegration and integration of the devices is not limited to those shown in the drawings, and all or part of them can be functionally or physically disintegrated or integrated in desired units depending on various loads, status of use, and the like.

Moreover, all or desired part of each processing function performed by each device can be realized by a CPU or a program analyzed and executed by the CPU, or it can be realized as wired logic hardware.

As described above, according to one aspect of the present invention, the operation of updating the software can be advantageously automated including changing the network configuration.

Furthermore, according to another aspect of the present invention, the rolling application of a patch to information processing apparatuses operated in parallel using the load balancer can be advantageously automated.

Moreover, according to still another aspect of the present invention, it can be advantageously confirmed that there was no problem with updating the software before starting the operation.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable recording medium that stores therein a computer program for performing an information collection and an operation instruction by performing a communication with a program deployed in an information processing apparatus via a network, to perform an update of a software of the information processing apparatus, the computer program causing a computer to execute:

acquiring configuration information from a database that stores therein current configuration information of the information processing apparatus, post configuration information of the information processing apparatus after updating the software, and configuration information of a load balancer connected to the information processing apparatus via the network, the load balancer receiving all requests from clients and assigning some of the requests to the information processing apparatus;

changing a setting of the load balancer as appropriate; and software applying including:

determining a software to be installed in the information processing apparatus or to be removed from the information processing apparatus by comparing the current configuration information with the post configuration information acquired at the acquiring, instructing the program deployed in the information processing apparatus to install or remove the software, determining, from the configuration information of the load balancer acquired at the acquiring, whether a change of the setting of the load balancer is needed upon installing or removing the software, and instructing, when the change of the setting of the load balancer is determined to be needed, the changing to change the setting of the load balancer.

2. The computer-readable recording medium according to claim 1, wherein the software applying includes instructing, when the information processing apparatus in which the software is to be installed or from which the software is to be removed is determined to be connected to the load balancer from the configuration information acquired at the acquiring, the changing to change the setting of the load balancer in such a manner that the load balancer suspends a distribution of a processing to the information processing apparatus before installing or removing the software and resumes the distribution of the processing to the information processing apparatus after installing or removing the software.

3. The computer-readable recording medium according to claim 1, wherein the software applying includes instructing the program deployed in the information processing apparatus to execute an application-result confirming program for confirming a result of installing or removing the software, and collecting a result of executing the application-result confirming program.

4. An apparatus comprising:

a processor; and a memory storing computer-readable instructions, execution of the instructions by the processor facilitating performance of an information collection and an operation instruction by performing a communication with a program deployed in an information processing apparatus via a network, to perform an update of a software of the information processing apparatus, execution of the instructions by the processor configuring the apparatus to include:

a configuration-information acquiring unit that acquires configuration information from a database that stores therein current configuration information of the information processing apparatus, post configuration information of the information processing apparatus after updating the software, and configuration information of a load balancer connected to the information processing apparatus via the network, the load balancer receiving all requests from clients and assigning some of the requests to the information processing apparatus;

a network-configuration setting unit that changes a setting of the load balancer as appropriate; and a software applying unit that determines a software to be installed in the information processing apparatus or to be removed from the information processing apparatus by comparing the current configuration information with the post configuration information acquired by the configuration-information acquiring unit, instructs the program deployed in the information processing apparatus to install or remove the software, determines, from the configuration information of the load balancer acquired by the configuration-information acquiring unit, whether a change of the setting of the load balancer is needed upon installing or removing the software, and instructs, when the change of the setting of the load balancer is determined to be needed, the network-configuration setting unit to change the setting of the load balancer.

5. The apparatus according to claim 4, wherein the software applying unit instructs, when the information processing apparatus in which the software is to be installed or from which the software is to be removed is determined to be connected to the load balancer from the configuration information acquired by the configuration-information acquiring unit, the network-configuration setting unit to change the setting of the load balancer in in such a manner that the load balancer suspends a distribution of a processing to the information processing apparatus before installing or removing the software, and resumes the distribution of the processing to the information processing apparatus after installing or removing the software.

6. The apparatus according to claim 4, wherein the software applying unit instructs the program deployed in the information processing apparatus to execute an application-result confirming program for confirming a result of installing or removing the software, and collects a result of executing the application-result confirming program.

7. A method of a software updating apparatus for performing an information collection and an operation instruction by performing a communication with a program deployed in an information processing apparatus via a network, to perform an update of a software of the information processing apparatus, the method of the software updating apparatus comprising:

acquiring configuration information from a database that stores therein current configuration information of the information processing apparatus, post configuration information of the information processing apparatus after updating the software, and configuration information of a load balancer connected to the information processing apparatus via the network, the load balancer receiving all requests from clients and assigning some of the requests to the information Processing apparatus;

changing a setting of the load balancer as appropriate; and software applying including determining a software to be installed in the information processing apparatus or to be removed from the information processing apparatus by comparing the current configuration information with the post configuration information acquired at the acquiring, instructing the program deployed in the information processing apparatus to install or remove the software, determining, from the configuration information of the load balancer acquired at the acquiring, whether a change of the setting of the load balancer is needed upon installing or removing the software, and instructing, when the change of the setting of the load balancer is determined to be needed, the changing to change the setting of the load balancer.

8. The method according to claim 7, wherein the software applying includes instructing, when the information processing apparatus in which the software is to be installed or from which the software is to be removed is determined to be connected to the load balancer from the the configuration information acquired at the acquiring, the changing to change the setting of the load balancer in such a manner that the load balancer suspends a distribution of a processing to the information processing apparatus before installing or removing the software and resumes the distribution of the processing to the information processing apparatus after installing or removing the software.

9. The method according to claim 7, wherein the software applying includes instructing the program deployed in the information processing apparatus to execute an application-result confirming program for confirming a result of installing or removing the software, and collecting a result of executing the application-result confirming program.

* * * * *